United States Patent [19]

Bayan

[11] Patent Number: 4,927,882

[45] Date of Patent: May 22, 1990

[54] SBR THERMOPLASTIC ELASTOMER

[75] Inventor: Ghawamedin Bayan, West Chester, Pa.

[73] Assignee: The West Company, Incorporated, Phoenixville, Pa.

[21] Appl. No.: 255,498

[22] Filed: Oct. 11, 1988

[51] Int. Cl.$^5$ .................... C08L 23/26; C08L 9/06; C08L 53/02; C08L 23/12
[52] U.S. Cl. ........................................... 525/99
[58] Field of Search ............................. 525/99

[56] References Cited

U.S. PATENT DOCUMENTS

| 4,188,432 | 2/1980 | Holden et al. | 525/95 |
| 4,197,377 | 4/1980 | Bohm et al. | 525/99 |
| 4,340,684 | 7/1982 | Bohm et al. | 525/99 |
| 4,386,188 | 5/1983 | Grancio et al. | 525/99 |

FOREIGN PATENT DOCUMENTS 0060524 9/1982 European Pat. Off. .

*Primary Examiner*—Carman J. Securo
*Attorney, Agent, or Firm*—Eugene E. Renz, Jr.

[57] ABSTRACT

A thermoplastic elastomer composition produced by dynamic vulcanization of SBR has a dispersed phase of cross linked SBR, and a co-continuous matrix of SEBS and polypropylene.

9 Claims, No Drawings

SBR THERMOPLASTIC ELASTOMER

FIELD OF THE INVENTION

The present invention relates to a SBR based dynamically vulcanized thermoplastic elastomer which can be used in the pharmaceutical industry and consumer and health care industries for a variety of products such as, for example, vial stoppers, dropper bulbs, gaskets, o-rings and syringe tips.

BACKGROUND OF THE INVENTION

Elastomeric compositions in which styrene-butadiene rubber, hereinafter SBR, and a thermoplastic olefin resin such as polypropylene resulted in thermoplastic compositions which have been proposed for use in some applications where thermoplastic elastomers would be of advantage. However, many of the products produced by the dynamic vulcanization of SBR in the presence of materials such as polypropylene have not resulted in products which are suitable for some applications, for example, in the pharmaceutical industry. These materials lack cleanliness, high temperature stability or autoclave set. Because of extremely high quality control and concern for the integrity of the product contained in pharmaceutical containers, thermoplastic elastomers have been slow to be accepted as candidates for container closures, vial stoppers, dropper bulbs and the like. The product must have a high tensile strength and set resistance properties, be soft and thermally stable, and must be easy to process. Of particular need is material which has a low autoclave set which would be of value as a candidate for pharmaceutical packaging. Until the present time, such a material has not been developed which has all the many required properties for use successfully in the pharmaceutical industry.

U.S. Pat. No. 4,104,210 and U.S. Pat. No. 4,271,049, both describe two component systems in which high unsaturation diene rubbers and thermoplastic olefins are blended. Two component systems are shown in which SBR is dispersed in polypropylene, where polypropylene is the continuous phase.

U.S. Pat. No. 4,197,377 describes a thermoplastic elastomer blend in which about 10 to about 48 parts of a polyolefin such as polypropylene is employed, from 90 to about 10 parts by weight of SBR and a compound selected from triblock copolymers, diblock copolymers and polystyrene. The diblock copolymer is a styrene-butadiene copolymer and the triblock copolymer is a styrene-butadiene copolymer. The amount of this third component ranges from about 0.1 to about 80 parts by weight.

U.S. Pat. No. 4,250,273 describes a blend of uncured or partially cured mixtures of SBR, 1-olefin polymers or copolymers and highly saturated elastomers. One example of the highly saturated elastomer is polyisobutylene. The tri-blend of materials generally has the 1-olefin polymer or copolymer and the SBR rubber in the continuous phase.

U.S. Pat. No. 4,340,684 describes thermoplastic elastomeric blends of 1-olefin polymers, SBR rubbers and highly saturated elastomers and is a divisional of the previously mentioned U.S. Pat. No. 4,250,273. Similarly, U.S. Pat. No. 4,350,795 is a divisional of that same patent. All three of these patents relate to tri-blends in which the 1-olefin polymer or copolymer and the SBR are in the continuous phase. U.S. Pat. No. 4,385,142 is related to these previously described patents, but further include from about 5 to about 50 parts by weight of bitumen.

None of the prior art formulations which are described in those patents have the appropriate high tensile strength and set resistance properties that are desired while also being soft and thermally stable. Elastomeric compositions in which SBR is dynamically vulcanized in the presence of polypropylene and other polyolefins have resulted in thermoplastic compositions for use in some applications where thermoplastic elastomers would be of advantage. None of these systems are capable of providing the ideal composition for use in the pharmaceutical industry. However, accordingly, it is an object of this invention to provide a thermoplastic elastomer composition which is suitable for use as a product in the pharmaceutical industry and which is useful in other applications where high tensile strength, low compression set, and thermally stable soft processable materials are desirable. Other objects will appear hereinafter.

SUMMARY OF THE INVENTION

The present invention provides a thermoplastic elastomer composition in which SBR is the dispersed phase in a co-continuous matrix of polypropylene and SEBS. The SEBS has a molecular weight of at least 100,000. These compositions have properties which are highly desirable for use in the pharmaceutical industry.

Specifically, the present invention comprises a thermoplastic elastomer produced by dynamic vulcanization of SBR in which the dispersed phase is cross linked SBR and the co-continuous matrix is comprised of up to about 60 parts of SEBS and up to about 30 parts of polypropylene per 100 parts of SBR.

The resulting product is admirably suitable for formulation into syringe plunger tips, gaskets, vial stoppers and blood tube stoppers, and other products useful in the pharmaceutical industry where it is necessary to subject the product to sterilization in a steam autoclave and/or radiation environment to produce a sterile useful product.

DETAILED DESCRIPTION OF THE PREFERRED EMBODIMENT

Any of the commercially available butadiene styrene rubbers may be used as the SBR component. SBR, a butadiene styrene rubber, is a random copolymer made from monomers of butadiene and styrene. The copolymer may be prepared in any of the well known conventional processes, such as through solution or emulsion polymerization. The amount of weight of butadiene may vary from as little as less than 60 percent of weight to more than 90 percent by weight, based upon the total weight of the copolymer. Even larger or smaller amounts of butadiene may be employed. The butadiene portion may contain as high as 90 or even 100% of 1,2-polybutadiene or 1,4-polybutadiene. The molecular weight, on a number average value, may be less than 50,000 and greater than one million. Preferred as SBR rubber is Duradene rubber manufactured by Firestone Tire and Rubber Company.

Prior to cross linking, the SBR rubber is the continuous phase and the other components are added. During cross linking of the SBR rubber, it becomes dispersed and, upon vigorous mixing, becomes particulated throughout the co-continuous phase of the mixture of polypropylene and SEBS.

Polypropylene is one of the two components which make-up the co-continuous matrix into which the SBR becomes dispersed while cross linking in the dynamic vulcanization process. The compositions of this invention have up to 30 parts of polypropylene, and preferably between about 5 and about 30 parts of polypropylene per 100 parts of SBR. A preferred range of this component is from about 10 to about 20 parts by weight of polypropylene.

The other component of the co-continuous matrix in which the SBR is dynamically vulcanized in an ethylene, butylene block copolymer having terminal polystyrene units, which polymers are referred to by the shorthand designation of SEBS copolymers. SEBS copolymers are added to the unvulcanized SBR along with the polypropylene in an amount up to about 60 parts SEBS. Preferred is about 10 to about 60 parts of SEBS, based upon 100 parts of SBR. Most preferred is a range of about 10 to about 30 parts of SEBS per 100 parts of SBR. The molecular weight of the SEBS is at least 100,000 in order to achieve maximum properties but it is possible to make products with somewhat lower molecular weight if lower tensile strength or higher compression set can be acceptable.

SEBS, the ethylene, butylene block copolymers having terminal polystyrene units, functions as a thermoplastic elastomer. These polymers are commercially available from Shell Chemical Company under the trademark KRATON G. Block copolymers described in U.S. Pat. No. 3,686,364 and U.S. Pat. No. 3,865,776 are typical examples of the block copolymers contemplated by the present invention. In the latter patent, assigned to Shell Oil Company, copolymers are described as having ethylene, butylene central blocks of from 50 to 80% by weight of the copolymer molecule in approximately equal proportions of ethylene and butylene. The terminal blocks are polystyrene. All of these materials are generically referred to as SEBS copolymers.

A number of experiments were performed to demonstrate the efficacy of the present invention. In these experiments, dynamic vulcanization of SBR was effected using polypropylene and SEBS as the co-continuous matrix. To evaluate the effectiveness of the compositions, particularly as a potential candidate for the pharmaceutical industry rubber products, tensile strength and compression set were measured using standard testing techniques. Unless specified to the contrary, the molecular weight of the SEBS was at least 100,000 in each case.

In each of the experiments performed and described herein, a straightforward procedure was used to dynamically vulcanize the SBR in the co-continuous matrix. The SBR, polypropylene and SEBS were charged to a Brabender mixer having 250 cc volume. The mixer is equipped with Banbury blades. At this point in the procedure, other materials normally used in thermoplastic elastomer formulations, such as plasticizers, fillers, antioxidants, coloring agents, and the like may be added if desired.

The mixtures is mixed at a temperature above the melting point of the plastic phase for five (5) minutes or until a homogeneous mix is obtained. In this series of experiments, a dual curing system was used. The first agent, m-phenylenebismaleimide, is added at any time from the beginning of the mixing cycle or with the others additives up to just prior to addition of the second curing agent.

Because of shear action, the temperature of the mixture rises to about 175° C. as a homogeneous mix is obtained. At this time, when the temperature of the mixture reached 175° C., a peroxide curing agent is quickly added to the mixture while intensive mixing is taking place. During this time, the torque and temperature rise to higher levels. The temperature of the mixture is controlled at 185° C. by controlling the rotor speed.

Three (3) minutes after the peroxide incorporation, a scavenger is added to scavenge the unused free-radicals. Sandostab PEP-Q is a commercially available scavenger for free-radicals that has been found to be effective. The mixing is continued after the addition of the scavenger for three (3) additional minutes before the mixture is removed from the Brabender.

The resulting thermoplastic elastomer composition, including a dispersed phase of cross linked SBR and a co-continuous matrix of SEBS and polypropylene, is then molded into test portions or actual products, as desired. In the series of experiments described herein, the mixture from the Brabender was compression molded at 195° C. for approximately fourteen (14) minutes. ASTM testing methods were used to evaluate the physical properties. For tensile strength, at break at 20 inches per minute, ASTM D412 test method was used. For compression set at 70° C. per 22 hour, Method B of ASTM D 395 was used.

In the first ten experiments, the amount of polypropylene was varied from 10 parts per hundred parts of SBR to as much as 30 parts of polypropylene per 100 parts of SBR. Similarly, the amount of SEBS ranges from 10 parts to 50 parts per 100 parts of SBR. In all of these experiments, the compression set is exceptionally good, being below 30%. Similarly, in all but one experiment, the tensile strength was at least 1000 PSI, indicating that a strong product is produced. These results are presented below in Table I.

Also shown in Table I are experiments 11, 12 and 13, in which the effect of using additional SEBS, additional polypropylene, or additional quantities of both materials is shown to have a negative effect on the compression set values.

TABLE I

| Experiment Number | Polypropylene PHR | SEBS PHR | Compression Set, % | Tensile PSI |
| --- | --- | --- | --- | --- |
| 1 | 10 | 50 | 23 | 480 |
| 2 | 17 | 50 | 28 | 1000 |
| 3 | 17 | 30 | 24 | 1100 |
| 4 | 17 | 17 | 18 | 1000 |
| 5 | 17 | 10 | 20 | 1000 |
| 6 | 20 | 20 | 20 | 1080 |
| 7 | 20 | 30 | 25 | 1200 |
| 8 | 30 | 50 | 29 | 1250 |
| 9 | 30 | 30 | 27 | 1460 |
| 10 | 30 | 10 | 27 | 1110 |
| 11 | 17 | 100 | 32 | 1100 |
| 12 | 40 | 30 | 32 | 1800 |
| 13 | 80 | 80 | 37 | 2700 |

In Table II, dynamic vulcanizations of SBR were accomplished by the same procedure using different block copolymers. Specifically, 100 parts of SBR were dynamically vulcanized using 17 parts of polypropylene and 17 parts of two different block copolymers and compared with the product of example 4.

In experiment 4, according to the present invention, the SEBS block copolymer performed exceptionally well, providing high strength and exceptionally good compression set. In experiment 14, the substitution of 17 parts of SBS having a molecular weight over 100,000, a styrene-butadiene-styrene copolymer produced poor results. Similarly, in experiment 15, the substitution of the SIS copolymer having a molecular weight over 100,000, styrene-isoprene-styrene produced poor results in both tensile strength and compression set.

TABLE II

| Experiment Number | Block Polymer | Tensile, PSI | Compression Set, % |
|---|---|---|---|
| 4 | SEBS | 1000 | 18 |
| 14 | SBS | 500 | 43 |
| 15 | SIS | 635 | 43 |

As shown in Table III, experiments 16, 17 and 18 show the effect of varying the weight average molecular weight of the SEBS component. In each experiment, 100 parts of SBR were dynamically vulcanized with 17 parts of polypropylene. The effect of molecular weight is clearly shown in both tensile strength and compression set, when compared to a product having a high molecular weight.

TABLE III

| Experiment Number | SEBS Mol. Wt. | Tensile, PSI | Compression Set, % |
|---|---|---|---|
| 16 | 68,000 | 700 | 63 |
| 17 | 88,000 | 700 | 42 |
| 18 | 130,000 | 1000 | 18 |

Finally presented below in Table IV are various pharmaceutical properties of a preferred embodiment of the present invention, shown in experiment 4 of Table I. This product compares favorably with commercially available products made from a thermoset SBR and natural rubber compound.

TABLE IV

| Pharmaceutical Closure Property Comparison | | |
|---|---|---|
|  | Invention | Commercial |
| Compression set, % Method B, 70° C. | 20 | 22 |
| Autoclave set, % 270° F., 15 min., 25% deflection | 60 | 30 |
| pH shift, USP method | −0.1 | +0.7 |
| Turbidity (Nephelos units), USP method | 1 | 105 |
| Reducing agents (ml of 0.01 N I) USP method | 0.01 | 1.5 |
| Total extractables (mg) USP method | 0.0 | 3.3 |
| Heavy metals, ppm lead and zinc USP method | 0.0 | 0.4 |
| Toxicity, acute systemic | non | non |
| Toxicity, intracutaneous | non | non |
| Swelling, cotton oil, % | 14 | 39 |
| Swelling, mineral oil, % | 30 | 68 |

Compositions of the type described and claimed herein have been formulated into syringe plunger tips, gaskets, and vial stoppers. All of them have demonstrated acceptable properties for use in the pharmaceutical industry, particularly good strength and compression set. Resistance to damage during steam autoclaving and radiation sterilization is also a particular advantage of the present invention.

While particular embodiments of the present invention have been illustrated and described herein, it is not intended to limit the invention and changes and modifications may be made therein within the scope of the following claims.

What is claimed is:

1. A thermoplastic elastomer comprising a composition having a compression set less than about 30% and produced by dynamic vulcanization of SBR to form a dispersed phase of cross-linked SBR in a co-continuous matrix of SEBS and polypropylene.

2. A thermoplastic elastomer comprising a composition having a compression set less than about 30% and produced by dynamic vulcanization of SBR, to form a dispersed phase of cross linked SBR in a co-continuous matrix of 10 to about 60 parts per 100 of SBR of SEBS having a molecular weight about 100,000 and 10 to about 30 parts per 100 parts of SBR of polypropylene.

3. The compression of claim 1, wherein the molecular weight of said SEBS is above 100,000.

4. The composition of claim 1, wherein the matrix is at least 20 parts per 100 parts of SBR the amount of SEBS ranges from about 10 to about 60 parts and the amount of polypropylene ranges from about 5 to about 30 parts, per 100 parts of SBR.

5. The composition of claim 1, wherein the amount of SEBS ranges from about 10 to about 30 parts and the amount of polypropylene ranges from about 10 to about 20 parts, per 100 parts of SBR.

6. The composition of claim 2, wherein the amount of SEBS ranges from about 10 to about 30 parts and the amount of polypropylene ranges from about 10 to about 20 parts, per 100 parts of SBR.

7. A thermoplastic elastomer having a tensile strength of at least 1000 and a compression set less than 30%, comprising:

a dynamically vulcanized dispersed phase of cross linked SBR in a co-continuous matrix of polypropylene and SEBS having a molecular weight of at least 100,000.

8. The composition of claim 7, wherein the matrix is at least 20 parts per 100 parts of SBR the amount of SEBS ranges from about 10 to about 60 parts and the amount of polypropylene ranges from about 5 to about 30 parts, per 100 parts of SBR.

9. The composition of claim 7, wherein the amount of SEBS ranges from about 10 to about 30 parts and the amount of polypropylene ranges from about 10 to about 20 parts, per 100 parts of SBR.

* * * * *